July 25, 1933.  C. DEGUIDE  1,919,832

PROCESS OF MANUFACTURE OF ALKALI METAL CARBONATES

Filed Nov. 11, 1929

INVENTOR
CAMILLE DEGUIDE
by his attorneys

Patented July 25, 1933

1,919,832

UNITED STATES PATENT OFFICE

CAMILLE DEGUIDE, OF ENGHIEN, FRANCE, ASSIGNOR TO INTERNATIONAL INDUSTRIAL & CHEMICAL COMPANY, LTD., OF MONTREAL, CANADA, A CORPORATION OF CANADA

PROCESS OF MANUFACTURE OF ALKALI METAL CARBONATES

Application filed November 11, 1929, Serial No. 406,539, and in France November 21, 1928.

The present invention relates to a process of manufacture of alkali carbonates, starting from alkali sulphates or passing through the intermediary of these sulphates, this process being able to be continuous at will.

In the United States Letters Patent No. 1,463,037 dated July 24, 1923, there has been described a process of manufacture of alkali silicates by treating a solution of alkali sulphates with a silicate of barium, mixed or not with barium hydrate, according to the reaction (in the case of soda and bibarytic silicate):

$$SiO_2.2BaO + xH_2O + 2Na_2SO_4 = Na_2SiO_3 + 2NaOH + 2BaSO_4 + (x-1)H_2O.$$

This process relates only to the preparation of an alkali silicate, with a caustic alkali as by-product.

According to the present invention, alkali carbonates can be produced starting from sulphates, by carbonating the product resulting from the reaction of the alkali sulphates upon the silicates of barium. In these conditions, the caustic alkali formed passes into the state of carbonate, as well as the alkali of the alkali silicate, the silica being precipitated and carried off with the barium sulphate formed.

This residue of silica and barium sulphate can be utilized afresh for the regeneration of the barytic silicate by calcination with or without carbon.

In the case where calcination is carried on in the presence of carbon, the reaction is as follows:—

(1) $SiO_2 + BaSO_4 + C = SiO_2.BaO + SO_2 + CO.$
(2) $SiO_2 + 2BaSO_4 + 2C = SiO_2.2BaO + 2SO_2 + 2CO.$
(3) $SiO_2 + 3BaSO_4 + 3C = SiO_2.3BaO + 3SO_2 + 3CO.$

These three equations show respectively the regeneration of monobaritic, bibaritic and tribaritic silicates.

In the case where calcination is carried on without the presence of carbon, the reaction is as follows:—

(4) $SiO_2 + BaSO_4 = SiO_2.BaO + SO_2 + O.$
(5) $SiO_2 + 2BaSO_4 = SiO_2.2BaO + 2SO_2 + 2O.$
(6) $SiO_2 + 3BaSO_4 = SiO_2.3BaO + 3SO_2 + 3O.$

These three equations show, again respectively, the regeneration of monobaritic, bibaritic and tribaritic silicates.

The sulphurous acid evolved during this regeneration can be transformed into sulphuric acid or into sulphur, or utilized in the manufacture of the alkali sulphate, starting from alkali chloride according to the known processes. This alkali sulphate can be employed as primary material for the main reaction.

There is indicated hereafter, only by way of example, a mode of carrying out the process (forming the) object of the invention:

In this example it has been assumed that it is a question of manufacturing carbonate of soda starting from bibarytic silicate.

To a solution which contains 284 kilograms of sulphate of soda, there are added 366 kilograms of bibarytic silicate and water to obtain a fluid mixture. The solution decomposes into silicate of soda, hydrate of soda and sulphate of baryta, according to the known reaction:

$$2Na_2SO_4 + SiO_2.2BaO + H_2O = Na_2SiO_3 + 2NaOH + 2BaSO_4.$$

There is passed into the mass a current of carbonic acid, which gives a filtrable or decantable liquid which is a solution of carbonate of soda and a precipitated residue which is a mixture of silica and sulphate of baryta, according to the reaction:

$$Na_2SiO_3 + 2NaOH + 2BaSO_4 + 2CO_2 = SiO_2 + 2Na_2CO_3 + 2BaSO_4 + H_2O.$$

The liquid after decantation or filtration can be evaporated and gives a carbonate of soda.

The precipitated residue consisting of silica ($SiO_2$) and $2BaSO_4$, can be calcined in the presence or not of carbon at a temperature of about 1300° to 1500° C. in an ordinary or rotary furnace. There is obtained baritic silicate ($SiO_2.2BaO$), which is thus regenerated from the sulphurous anhydride ($SO_2$) escaping in the form of gas, for example according to the equation:

$$SiO_2 + 2BaSO_4 + 2C = SiO_2.2BaO + 2SO_2 + 2CO$$

It is possible to again use the baritic silicate ($SiO_2 \cdot 2BaO$) formed by mixing it with alkaline sulphate ($2Na_2SO_4$) and water to recommence the operations following a cycle without appreciable losses in the bibaritic silicate. The primary materials, the sulphate and the carbonic acid enter into the cycle, and the alkali carbonate and the sulphurous acid pass out of the cycle without leaving residues.

The sulphurous acid which is evolved during the calcination may be utilized in order to produce, starting from marine salt, as is known, the sulphate of soda necessary for the cyclic process of manufacture, according to one of the many known processes, for example according to the Hargreaves process which gives hydrochloric acid as a by-product.

When starting from natural or manufactured or residual sulphate of soda, and when sulphurous acid is not needed for forming it, this gas may be employed in particular for the manufacture of sulphuric acid or sulphur or again of sulphates and hydrosulphates.

The carbonate of soda, which is the only body soluble in the liquid product of the main reaction, gives a very pure product, the impurities, if there be any, being carried off by the baryta in the precipitated residue and in the calcining kiln.

With sulphate or chloride of potassium, for example, there can be obtained carbonate of potash in the same manner.

The accompanying flow sheet illustrates two ways of working the process described.

Figure 1:
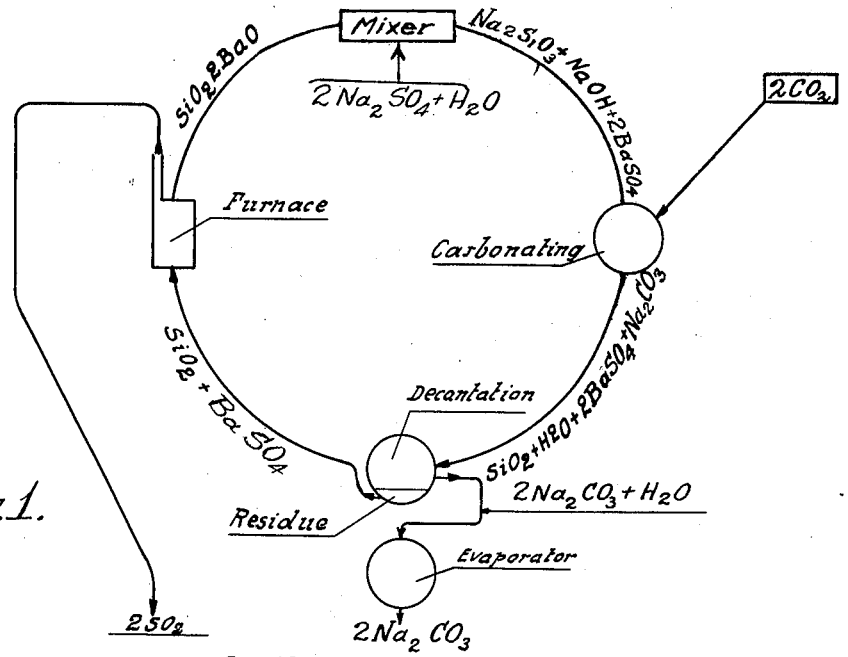
Figure 1 illustrates diagrammatically a cyclic process for manufacturing alkaline carbonates beginning with alkaline sulphate and bibaritic silicate with regeneration of the latter.
Figure 2:
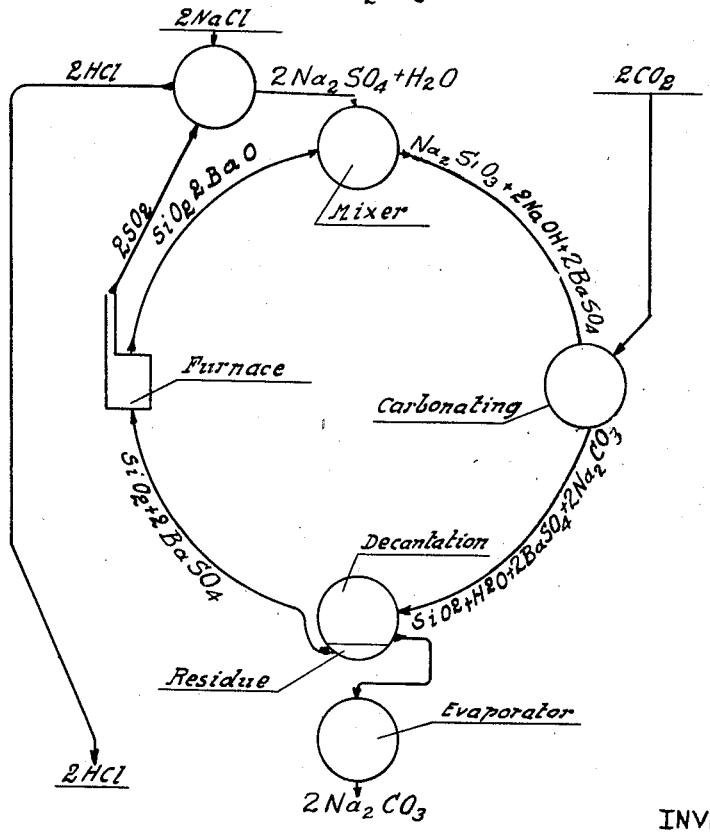
Figure 2 illustrates diagrammatically a cyclic process for the manufacture of alkaline carbonates beginning with an alkaline sulphate and bibaritic silicate with regeneration of the first two materials.

What I claim is:

1. A process of manufacture of alkali metal carbonates from alkali metal sulphates, consisting in treating an alkali metal sulphate by water and a barium silicate, directly treating the mixture resulting from the reaction with carbonic acid to form a solution of alkali metal carbonate, separating said solution of alkali metal carbonate from the insoluble residue, consisting of silica and sulphate of barium, and evaporating the water of the said solution to recover the alkali metal carbonate.

2. A cyclic process of manufacture of alkali metal carbonates from alkali metal sulphates, consisting in treating an alkali metal sulphate by water and a barium silicate directly treating the mixture resulting from the reaction with carbonic acid, to form a solution of alkali metal carbonate, separating said solution of alkali metal carbonate from the insoluble residue, consisting of silica and sulphate of barium, and evaporating the water of the said solution to recover the alkali metal carbonate, and calcining the said insoluble residue, consisting of silica and sulphate of barium, to form gases of sulphurous acid as a by-product and to regenerate the barium silicate, and treating new alkali metal sulphate by the said regenerated barium silicate and water.

3. A cyclic process of manufacture of alkali metal carbonates from alkali metal sulphates, consisting in treating an alkali metal sulphate by water and a barium silicate, directly treating the mixture resulting from the reaction with carbonic acid, to form a solution of alkali metal carbonate, separating said solution of alkali metal carbonate from the insoluble residue, consisting of silica and sulphate of barium, and evaporating the water of the said solution to recover the alkali metal carbonate, and calcining, in the presence of carbon, the said insoluble residue, consisting of silica and sulphate of barium, to form gases of sulphurous acid as a by-product, and to regenerate the barium silicate, and treating new alkali metal sulphate by the said regenerated barium silicate and water.

4. A cyclic process of manufacture of alkali metal carbonates from alkali metal sulphates, consisting in treating an alkali metal sulphate by water and a barium silicate, directly treating the mixture resulting from the reaction with carbonic acid, to form a solution of alkali metal carbonate, separating said solution of alkali metal carbonate from the insoluble residue, consisting of silica and sulphate of barium, and evaporating the water of the said solution to recover the alkali metal carbonate, and calcining, in the presence of carbon, the said insoluble residue, consisting of silica and sulphate of barium, to form gases of sulphurous acid and to regenerate the barium silicate, treating an alkali metal chloride by said sulphurous acid to form an alkali metal sulphate, and treating again said alkali metal sulphate by water and the regenerated barium silicate.

CAMILLE DEGUIDE.